United States Patent [19]

Haynes

[11] 4,062,058
[45] Dec. 6, 1977

[54] NEXT ADDRESS SUBPROCESSOR

[75] Inventor: Leonard S. Haynes, Columbia, Md.

[73] Assignee: The United States of America as represented by the Secretary of the Navy, Washington, D.C.

[21] Appl. No.: 657,812

[22] Filed: Feb. 13, 1976

[51] Int. Cl.² .............................................. G06F 9/20
[52] U.S. Cl. ................................................... 364/200
[58] Field of Search ........................ 340/172.5; 445/1

[56] References Cited

U.S. PATENT DOCUMENTS

| | | | |
|---|---|---|---|
| 3,551,895 | 12/1970 | Driscoll, Jr. et al. | 364/200 |
| 3,577,189 | 5/1971 | Cooke et al. | 340/172.5 |
| 3,614,745 | 10/1971 | Podvin | 340/172.5 |
| 3,699,526 | 10/1972 | Ishiyan et al. | 340/172.5 |
| 3,704,448 | 11/1972 | Osborne | 340/172.5 |
| 3,717,850 | 2/1973 | Ghirov et al. | 340/172.5 |
| 3,725,868 | 4/1973 | Malmer et al. | 364/200 |
| 3,764,988 | 10/1973 | Onishi | 340/172.5 |
| 3,771,138 | 11/1973 | Celtruda et al. | 340/172.5 |
| 3,900,835 | 8/1975 | Bell et al. | 364/200 |

Primary Examiner—Harvey E. Springborn
Attorney, Agent, or Firm—R. S. Sciascia; A. L. Branning; R. E. Bushnell

[57] ABSTRACT

A subprocessor and a method for a digital computer processing a special class of programs wherein determination of the next processing program instruction address occurs simultaneously with execution of a preceding set of processing program instructions without incurring the delay inherent in performance of the intervening branch conditions.

7 Claims, 8 Drawing Figures

| | $R_1$ | $S_1$ | $D_1$ | $PA_1$ | $TA_1$ | $R_2$ | $S_2$ | $D_2$ | $PA_2$ | $TA_2$ | $R_3$ | $S_3$ | $D_3$ | $PA_3$ | $TA_3$ | $R_4$ | $S_4$ | $D_4$ | $PA_4$ | $TA_4$ | $R_n$ | $S_n$ | $D_n$ | $PA_n$ | $TA_n$ |
|---|---|---|---|---|---|---|---|---|---|---|---|---|---|---|---|---|---|---|---|---|---|---|---|---|---|
| ADDRESS 1 | Y | = | IF | 200 | 2 | Δ | | | 250 | 7 | | | | | | | | | | | | | | | |
| ADDRESS 2 | Y | > | 10 | 210 | 3 | Y | = | 10 | 220 | 3 | Y | < | 10 | 230 | 5 | Δ | | | 240 | 14 | | | | | |
| ADDRESS 3 | Z | ≥ | 10 | 300 | 6 | Y | > | 11 | 320 | 8 | Δ | | | 325 | 9 | | | | | | | | | | |
| ADDRESS 4 | | | | | | | | | | | | | | | | | | | | | | | | | |
| ADDRESS 5 | W | = | IF | 360 | 10 | W | = | FOR | 370 | 10 | W | = | JUMP | 380 | 12 | Δ | | | 385 | 13 | | | | | |
| ADDRESS 6 | | | | | | | | | | | | | | | | | | | | | | | | | |
| ADDRESS 7 | | | | | | | | | | | | | | | | | | | | | | | | | |
| ADDRESS 8 | | | | | | | | | | | | | | | | | | | | | | | | | |
| ADDRESS 9 | | | | | | | | | | | | | | | | | | | | | | | | | |

NEXT ADDRESS TABLE 12

TABLE ADDRESS REGISTER 10

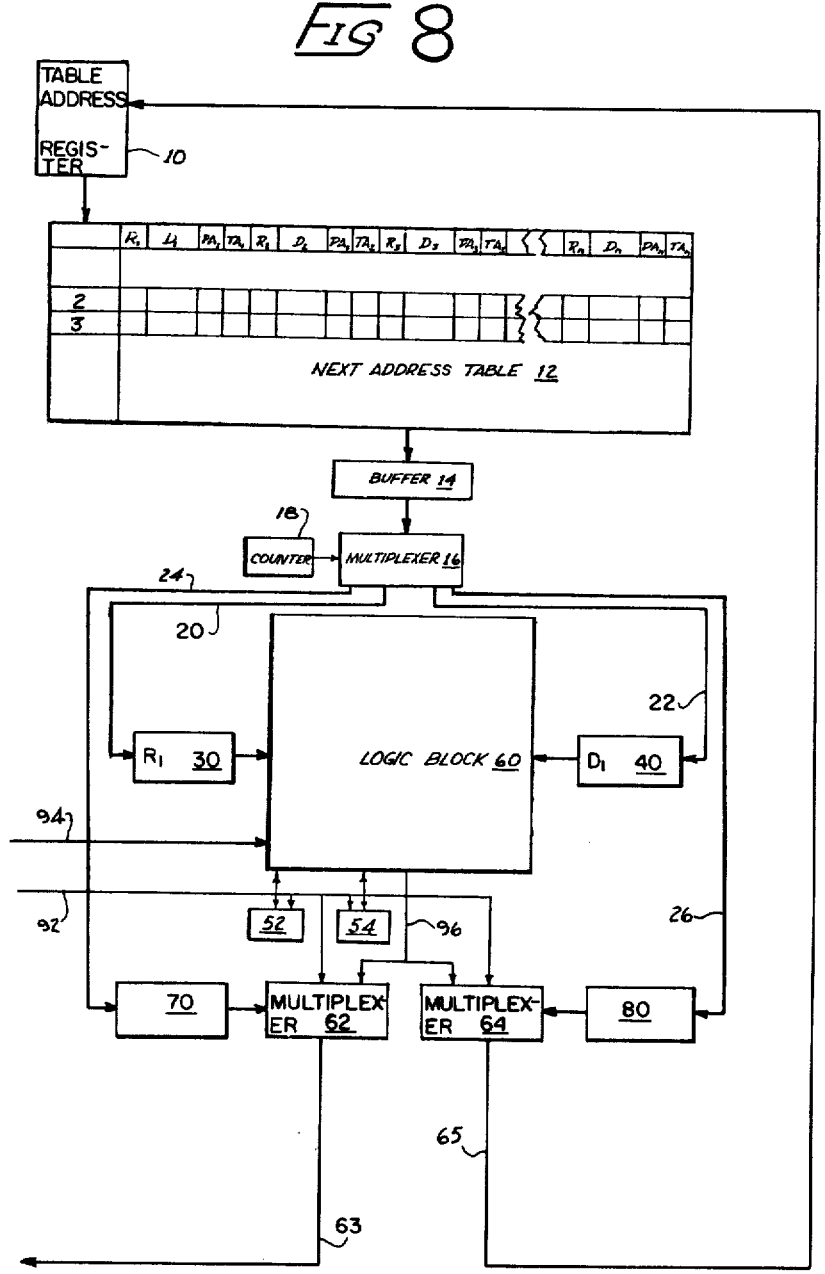

NEXT ADDRESS SUBPROCESSOR

BACKGROUND OF THE INVENTION

This invention relates to instruction processing in an electronic digital computer. More particularly, this invention relates to an apparatus and a method in a digital computer which allows greatly improved program branching for a specific class of programs, and is to be distinguished from similar inventions directed to the problem of anticipating or reducing the delay between execution of the steps in the user class of programs.

A user language computer program is typically written in a high level language easily readable by the program's user. Before the computer can act on the program however, the translator of the computer must convert the individual components of the user language program into the machine level language of the computer. The translator does this by executing a system routine, known as a compiler. The compiler, like any other program, includes sets of sequential instructions connected by one or more branch conditions (or, by analogy, program paths connected by one or more junctions). Speed of performance for state of the art digital computers in performing uninterrupted or non-branching instruction sets is very good. In any digital computer program however, branching is a virtual necessity. Furthermore, due to the necessity of resolving branch conditions, the instruction sequencing mechanism of the computer would not know which set of instructions to prepare next.

Each compiler instruction is identified by its position in the program, each position having a program address (PA). After executing each of the sequential instructions in a given set, a branch point or junction is reached. Here the compiler, like any other program, must execute one or more "overhead" instructions in order to obtain the program address of the first instruction to be performed in the next set of instructions (i.e., the effective branch address, or the next program address or NPA). The instruction sequencing mechanism, a register known as a program counter (PC), stores the current program address. Each compiler branch point typically requires the translator to perform several "overhead" steps, and it is not uncommon for the translator to devote from twenty to thirty percent of its time to executing the steps required to evaluating which branch condition is met or, in other words, determining the NPA after a branch point. From 1 to 14 microseconds per branch condition may be required using state of the art translators.

In the prior art, the vast majority of branch point conditions require comparing a value stored in a given translator register, W, with a literal value (e.g. "IF", "THEN", "ELSE", +, −, *, /, etc.). Each possible case W = "IF", "W" = "THEN", etc., defines a different NPA. For each comparison, the following typical operations must be performed:

| | |
|---|---|
| 100 | LOAD W |
| 101 | SUBTRACT "IF" |
| 102 | JUMP ZERO TO W = "IF" NPA |
| 103 | TRY NEXT COMPARISON |
| o | o |
| 0 | o |
| o | o |

Only after the value of translator register W has either successfully compared with a literal value (e.g., "IF") of one of the compiler branch conditions or defaulted in a favorable comparison, and the program counter has the address of the first instruction in the next set of instructions, is the translator able to continue with the useful portion of the compilation of the user program.

SUMMARY OF THE INVENTION

Embodiments of the present invention overcome the disadvantages and limitations of the prior art by providing apparatus and method through which a main processing unit nearing completion of one set of program instructions is, upon transmission of an appropriate cue to a subprocessing unit, furnished with the program address of the next set of program instructions without the delay concomitant to evaluation of the intervening branch conditions.

While the main processor (e.g., a translator) is occupied in execution of a set of routine instructions, a subprocessor compares the values of one or more registers of the main processor with literal values in that part of the subprocessor main memory having an address corresponding to the address of the branch conditions sequentially succeeding the current routine instructions in accordance with the arrangement of those branch conditions. Upon reception of a cue from the main processor, the subprocessor furnishes the routine program address of the next set of routine instructions to the program counter of the main processor. The subprocessor then goes to that part of its memory having an address corresponding to the next effective branch address and begins performing the operations necessary to a determination of the next program address succeeding the branch address just furnished.

Accordingly, it is an object of the present invention to provide an apparatus and a method of minimizing the delay occasioned to an instruction processing device of a digital computer due to branch conditions.

It is also an object of the present invention to provide an apparatus and a method for determination of the address of the first instruction of the next set of program instructions simultaneously with the execution of the program instructions preceeding the intervening branch conditions.

It is another object of the present invention to provide an apparatus and a method for performing a plurality of branch conditions while an adjoining apparatus simultaneously executes the set of program instructions preceeding the branch conditons.

It is yet another object of the present invention to provide an apparatus and a method for minimizing the delay occasioned to a digital computer device executing instructions common to the processing of the general class of user programs by the necessity of performing intervening branch conditions.

It is still yet another object of the present invention to provide an apparatus and a method which allows improved digital computer performance when branching from a first instruction sequence to a second instruction sequence.

It is a further object of the present invention to effect apparatus and a method in a digital computer which during execution of a sequence of instructions, simultaneously allows an auxiliary apparatus and method to satisfy the succeeding compound branch condition.

BRIEF DESCRIPTION OF THE DRAWINGS

A more complete appreciation of this invention and many of the attendant advantages thereof will be readily appreciated as the same becomes better understood by reference to the following detailed description when considered in conjunction with the accompanying drawings in which like numbers indicate the same or similar components, wherein:

FIG. 8 of the drawings is a single-line block diagram illustrating an alternative embodiment of a Next Address Processor incorporating the Next Address Table of FIG. 2.

DETAILED DESCRIPTION OF ONE EMBODIMENT

Figures 1, 2:
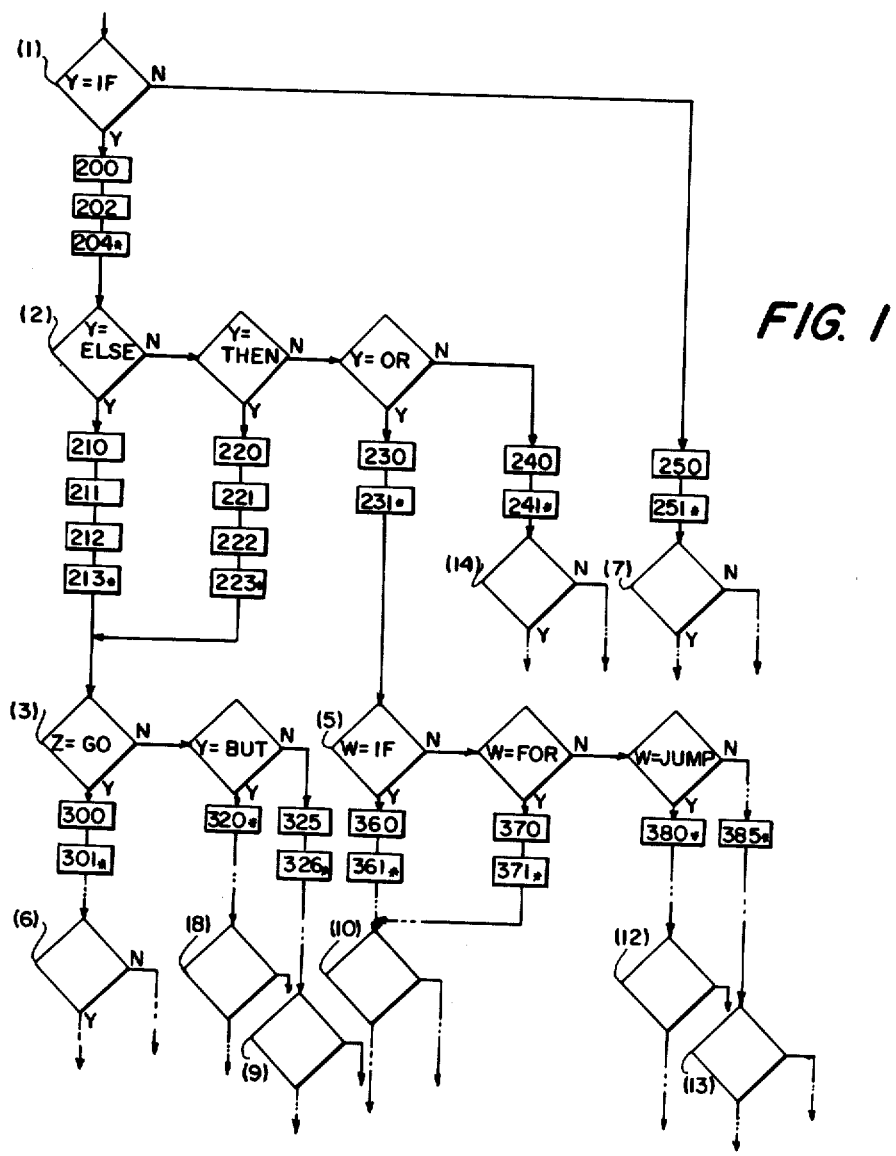
FIG. 1 of the drawings is a flow chart of a segment of a typical compiler routine.
FIG. 2 of the drawings shows a Next Address Table descriptive of the flow chart of FIG. 1.

Referring to FIG. 1, a flow chart for a segment of a typical digital computer program or routine is shown. This routine is formed by a plurality of sequential sets of instructions, each instruction being represented by a horizontal rectangle and identified by a program address appearing within the rectangle (e.g. 200, 202, or 204). Each set of instructions is separated from any other set by one or more branch points (e.g., <1>, <2>, or <3>). Each branch point being represented by one or more right diamond-squares joined by a horizontal line and identified by the bracketed number appearing on the upper-left side of the first or leftmost diamond. Each diamond represents one branch condition, and leads to either a set of instructions or an adjoining branch condition. In the prior art performance of that segment of the routine shown, a set of instructions, such as those corresponding to routine addresses 200, 202 and 204, are sequentially executed. A program counter in the digital computer, upon being incremented to a value equal to the program address of the succeeding routine instruction, initiated execution of that instruction. Upon reaching the next step in the routine, in this instance the branch point <2>, the prior art required the computer to perform a series of steps inherent in performance of each of the branch conditions of branch point <2> in order to make the determination of the appropriate next routine instruction. In this case, the first branch condition of branch point <2> requires a determination of whether or not the contents or value of that register identified as "Y" is equal to the literal value of "ELSE". Upon an affirmative comparison, the program counter is incremented to 210, the program address of the next routine instruction determined by performance of the comparison required by the first branch condition and execution of that instruction is initiated. If the value of register Y fails to equal the literal value "ELSE", the routine requires performance of the several steps necessitated by the comparison requested in the second branch condition of branch point <2>, in this case, whether or not the value of the user program stored in register Y equals the literal value "THEN". Upon an affirmative comparison, the program counter is incremented to program address 220. If the value of register Y fails to equal the literal value "THEN", the routine performs the several steps of the comparison in the third branch condition "Y = OR". If the performance of the third branch condition results in an affirmative comparison, the program counter is incremented to 230, and execution of the routine instruction having the address 240 is initiated. If the value of register Y fails to equal the literal value "OR", a default condition indicative of the failure to obtain an affirmative comparison at branch point <2> occurs, the program counter is incremented to 250, and execution of the routine instruction having program address 250 is initiated.

Accordingly, it is seen that each time the computer completes execution of a set of instructions, it must pause and perform the several steps required by one or more branch conditions before continuing with the execution of another set of instructions.

The present invention offers a method and a apparatus in a digital computer having a routine common to one frequently used program or to several programs having a common characteristic (e.g., user programs written in the same language), for minimizing the delay concomitant with the performance of the several steps of one or more branch point conditions in order to complete a transition from a set of routine instructions to one of the succeeding sets of instructions.

By way of example, the compiler of a translator, a program that is dedicated to converting a general class of users' programs from their user-readable or high level language into a machine readable or low level language, is the typical common routine to which the embodiments of the present invention are directed. FIG. 2 illustrates a next address table 12, a memory component arranged according to the teachings of the present invention for the segment of the flow chart illustrated by FIG. 1. In implementing the present invention, the last instruction in each set of routine instructions (e.g. those instructions at routine program addresses 204, 213, 223, . . . 371 . . . 385) are modified to contain a cue word, such as an asterisk. Table 12 has a series of memory locations individually addressable by table address register 10 (e.g., "Address 2", "Address 3"), each memory location being segmented into a plurality of fields (e.g., $R_2$, $D_2$, $PA_2$). Each Table address corresponds to one branch point of the routine, and may, depending upon the number of branch conditions at the corresponding branch point, span more than one memory location. The fields at each table address are arranged in succeeding groups, each group representing one lateral branch condition. Prior to running a user's or a frequently run program, several items of information or data pertinent to each of the branch conditions and the accompanying default condition for each of the branch points are encoded and stored in a selected arrangement of the fields at the memory location of the corresponding branch point. The R fields, the first and every fourth field thereafter, each contain the identity of the translator register holding the information to be compared during the performance of the respective branch conditions. The D fields, the second and every fourth field thereafter, contain the literal value against which the value of the register indicated by the adjoining R field is to be compared. The PA, or next program address fields, the third and every fourth field thereafter, each contain the address of the next routine to be executed if the value of the respective register compares affirmatively with the preceeding literal value. The TA, or next table address fields, every fourth field, each contain the table address where similar items of information or data is stored for that branch point first occurring after execution of the routine instruction having that address stored in the preceeding PA field.

If Address 1 is assigned to branch point 1 of FIG. 1, the first four fields of Address 1 will store coded information about the first branch conditon, "Y=IF" and the second four fields will store coded information about the adjacent default condition, "Y≠IF". Field $R_1$ will contain the identity of register "Y"; field $D_1$ will contain the literal value "IF"; field $PA_1$ will contain the next routine address 200; and field $TA_1$ will contain the table address 2, the memory location where similar coded information concerning branch point <2> is stored. Similarly, field $R_2$ will contain a cue, here Δ, indicating that none of the branch conditions at that branch point has produced an affirmative comparison and that no further comparisons of any information stored in successive fields need be attempted by the subprocessor. Accordingly, the $D_2$ field is usually empty. The $PA_2$ field contains the program address 250 of the next routine instruction to be performed given the failure of an affirmative comparison in the preceeding branch conditions, and the $TA_2$ field contains the table address assigned to the first branch point <7> occurring after execution of the routine instruction having program address 250. Each of the remaining branch points of the common routine are similarly assigned a subprocessor table address, and the equivalent items of information for each branch condition and their accompanying default condition are encoded and stored in the memory fields at that address.

Figure 3:
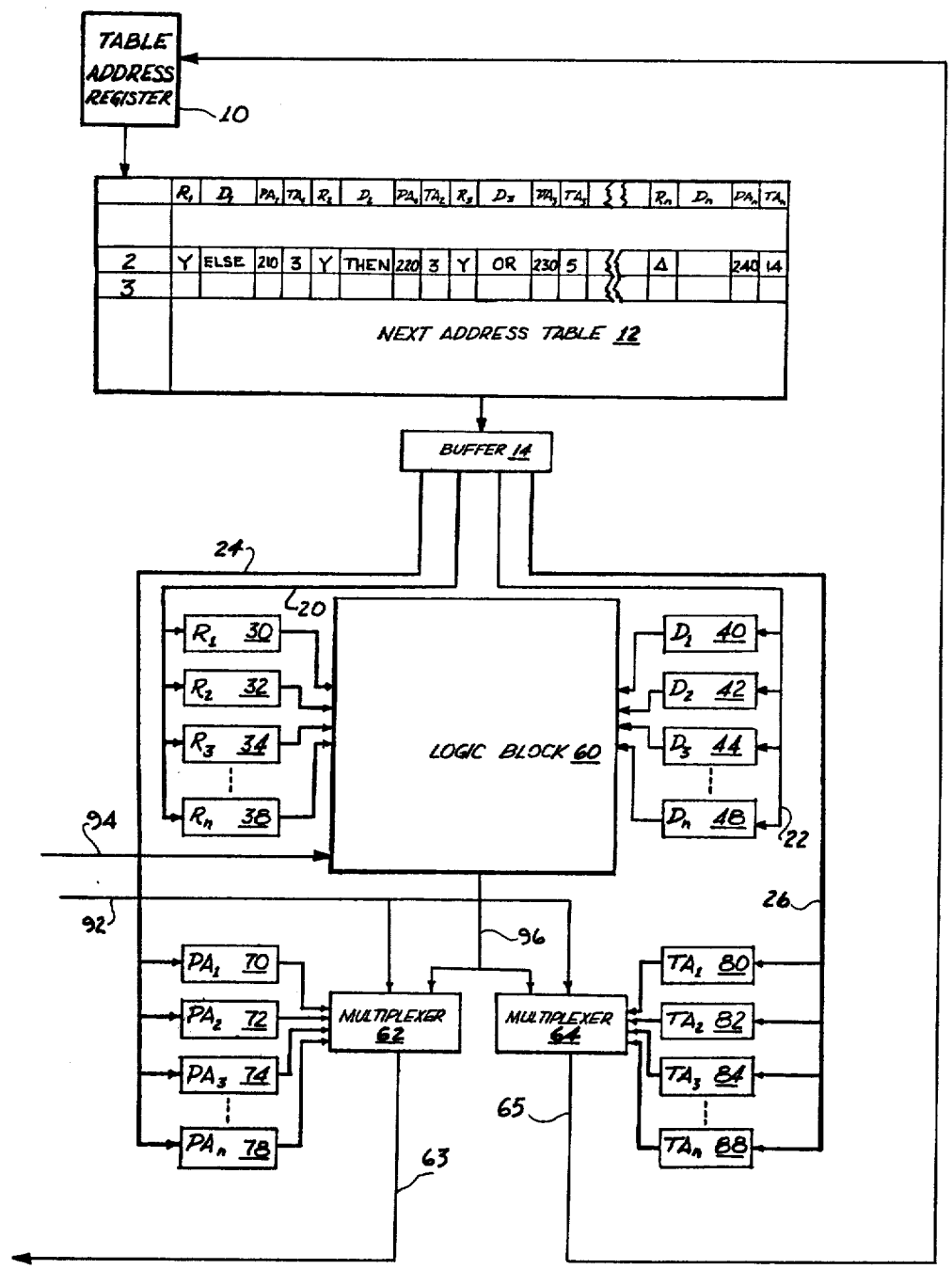
FIG. 3 of the drawings is a single-line block diagram illustrating an embodiment of a Next Address Processor incorporating the Next Address Table of FIG. 2.

Referring now to FIG. 3 which illustrates the block diagram of a next address subprocessor constructed according to the teachings of the present invention, the contents of the fields located at that table address of the next address table 12 specified by table address register 10 are read into buffer 14. Buffer 14 then loads its contents into one register of one of four groups of field registers, according to the type of field and the position of that field with respect to other fields of the same type at that table address. By way of example, if Address 2 of the next address table 12 is specified by table address register 10, the contents of the $R_1$ field which correspond to the address of the instruction register (not shown), the value of which is compared by the first branch condition of branch point <2>, here an identifier of the "Y" instruction register of the processor, is ultimately loaded via connection 20 into the first R field register $R_1$, 30. The contents of the first D, PA and TA fields are ultimately loaded into the first D, PA and TA field registers 40, 70 and 80, respectively. Similarly, the remaining contents of buffer 14 are loaded into that field register corresponding to the field and position in which that item is stored at Address 2.

Each of the R and D field registers are electrically coupled to logic block 60, a network of logic elements dedicated to a sequential performance of any comparisons required by the corresponding branch conditions. As the logic circuits of logic block operate on the contents of the first field-of-four (i.e., the first four memory locations having table address 2 in next address table 12), the value of the instruction or data register identified by the $R_1$ field register 30, here the "Y" register, is summoned via electrical connection 94, and compared to the literal value of the $D_1$ field register 40. If that comparison is favorable, the logic block 60 alerts multiplexers 62 and 64, via electrical connection 96, to prepare to connect the contents of $PA_1$ and $TA_1$ field registers to electrical connections 63 and 65, respectively.

If, however, the comparison of the value of the "Y" register with the literal value in $D_1$ field register 40 is not affirmative, logic block 60 continues with the comparisons required by successive fields-of-four; and, alerts multipliers 62 and 64 only upon either the occurrence of an affirmative comparison of the contents of an instruction register with the contents of the corresponding D field register, or the appearance of a word indicative of the default condition, such as the Δ stored in the $R_n$ field of Address 2, in a R field register. After the alert of multiplexers 62 and 64 of the connections to be made between electrical connectors 62 and 64 and the PA and TA field registers, the next address subprocessor may either remain idle or, either immediately, or upon command from an external source, increment table address register 10 to that table address corresponding to the branch point first occurring after execution of the routine instruction at the address contained in the selected TA field register. Upon execution of the last instruction including the cue word of the set of instructions preceeding the branch point corresponding to the current table address, here, for Address 2, the instruction at program address 204, the main processor transmits a signal via electrical connection 92 to multiplexer 62 and, depending upon the particulars of the subprocessor, to multiplexer 64. Upon reception of that signal, the multiplexers 62, 64 complete the connection previously selected by logic block 60, and increment the program counter of the main processor (not shown) and the table address register 10.

Figure 4:
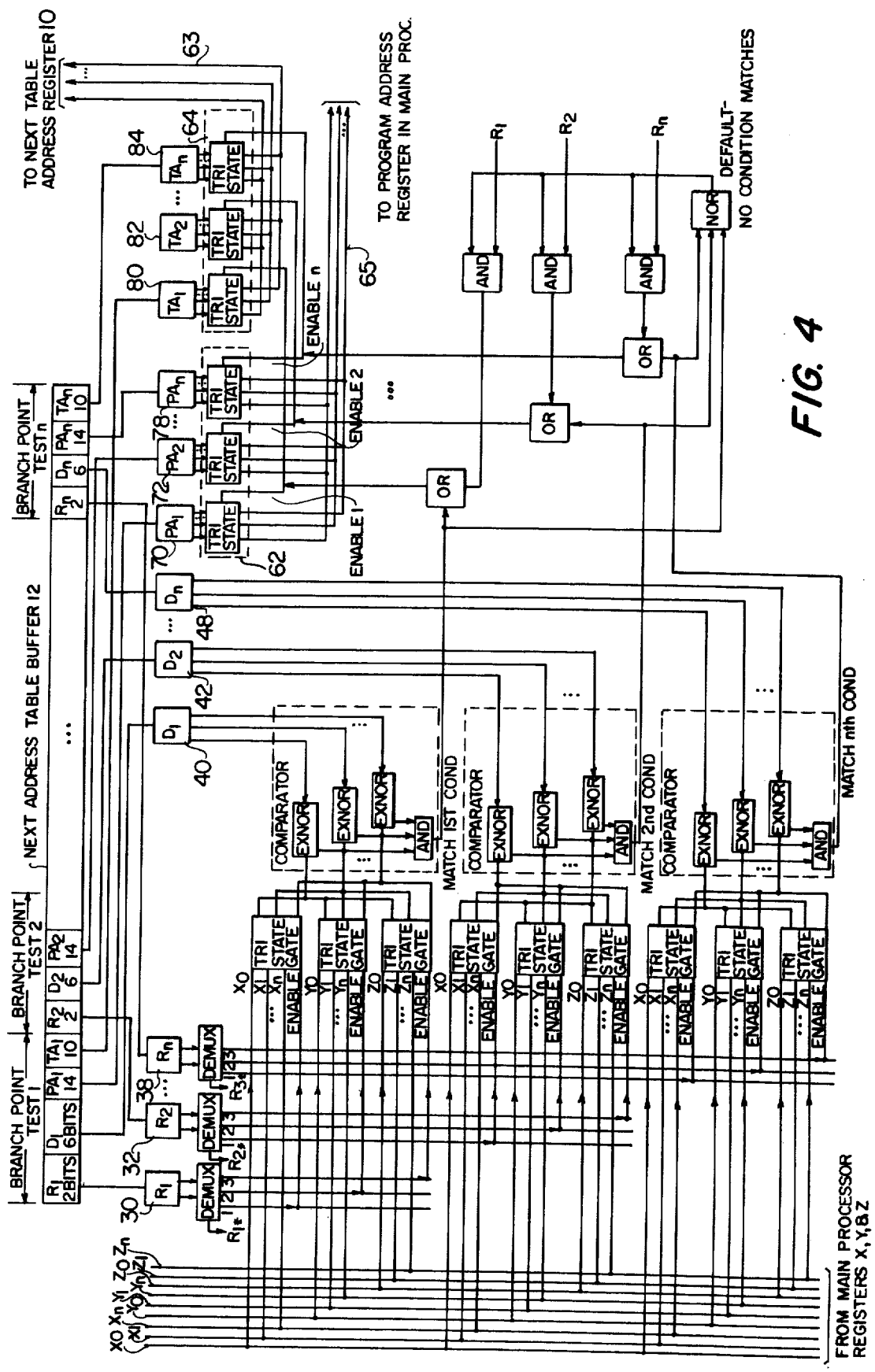
FIG. 4 of the drawings illustrates a detailed block schematic of the Logic Block of FIG. 3.

Referring now to FIG. 4, a detailed logic diagram of a typical logic block 60 showing its connections to field registers 30, 32, 38, 40, 42, 48, 70, 72, 78, 80, 82, and 88, next address table buffer 14, and multiplexers 62, 64 is illustrated in accordance with FIG. 3.

In the general case shown in FIG. 4, each of the permissable registers which can be indicated by the R field must be connected to each of 8 MUX's. The output of MUX (N) will be the value of the register indicated by R(N). This value will be compared with the literal value of the $D_n$ field by a simple Exclusive NOR gate arrangement, and if the values match, the correct code N will be bussed to MUX 2 and 3 to select the correct EBA and Next Table Address as described before.

In one application of an embodiment (a translator), most of the branch conditions require comparing one of a very few registers with a literal value. In almost every case, the R field value will indicate a particular register. Since all the conditions at a branch point are mutually exclusive, order doesn't matter, and most of the multiplexers can be eliminated. If any branch point will not have more than one comparison with a register other than R(1), then only one MUX is needed. Another simplification is that some of the MUX's can be connected to only some of the registers, requiring the encoding to place an R(N) value in a position where the corresponding MUX will be connected to register N, et cetera.

Figure 5:
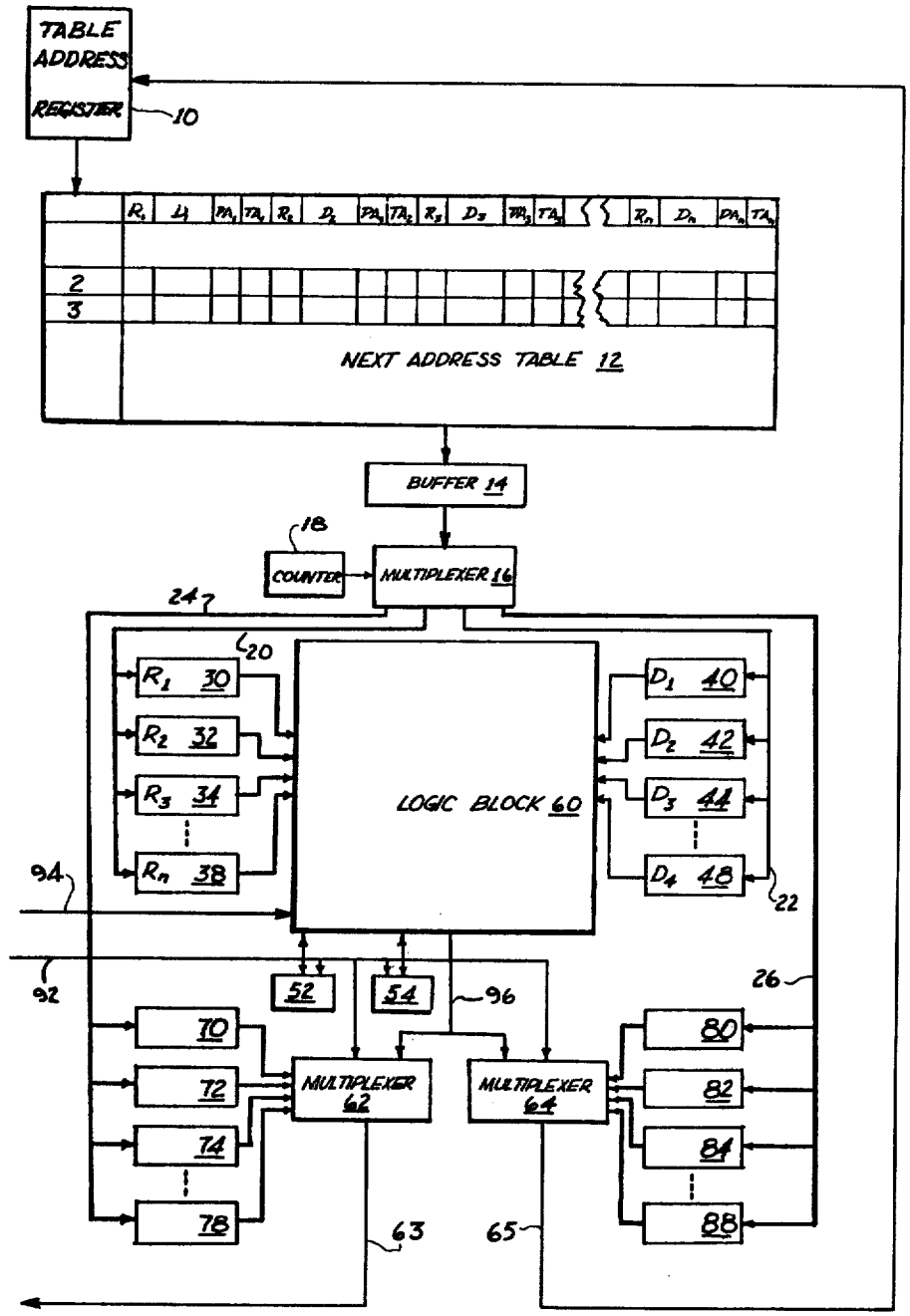
FIG. 5 of the drawings is a single-line block diagram illustrating an alternative embodiment of a Next Address Processor.

FIG. 5 illustrates in a single-line block diagram an alternate embodiment of the Next Address Subprocessor set forth in FIG. 3. By loading the contents of buffer 14 into multiplexer 16, and then into the field registers, the next address subprocessor is able to use a smaller buffer 14 while handling multi-branch condition addresses with a concomitant reduction in circuit complexity. Counter 18 instructs multiplexer 16 whether the first, second or Nth field-of-flow has been transferred from buffer 14 to the field registers. Logic block 60 also sets or resets semaphore gates 52 and 54 to either stop the subprocessor when it is waiting for transmission of a cue word from the main processor via electrical connection 92, or, in the case where the subprocessor has not yet determined the next program and effective branch addresses by the time the main processor has completed transmission of the cue signal, to halt the main processor.

Figures 6, 7:
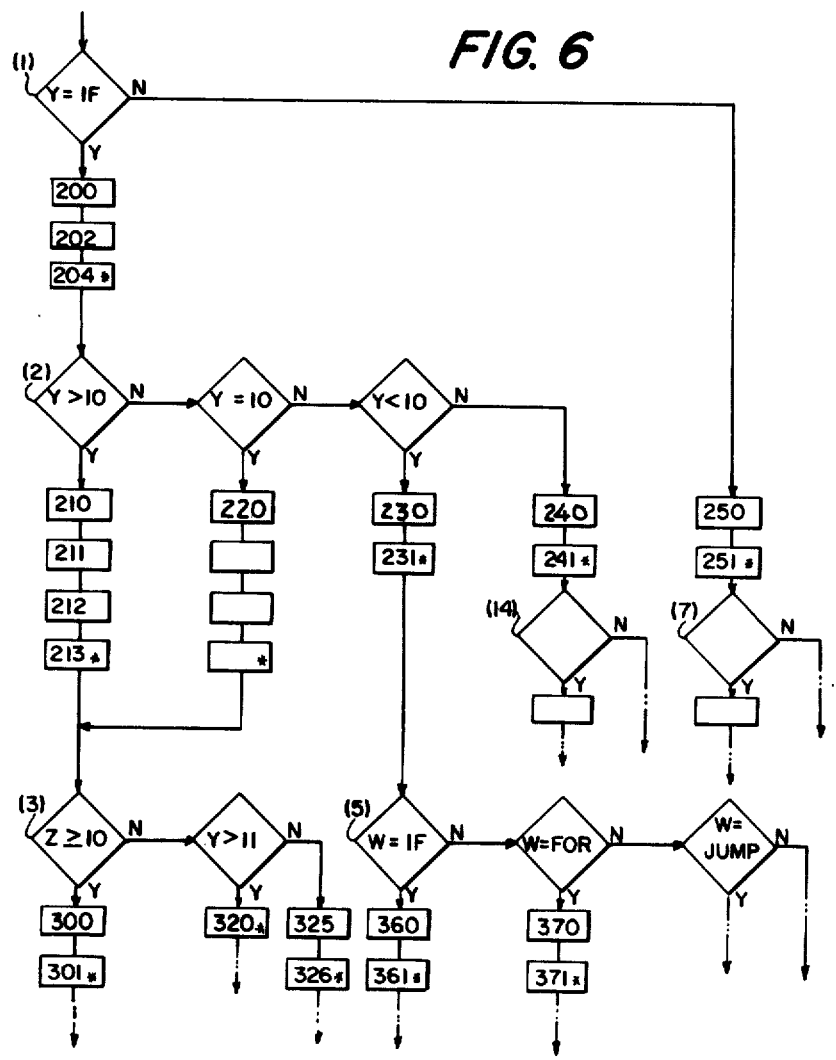
FIG. 6 of the drawing is a flow chart of a typical common routine.
FIG. 7 of the drawings is an expanded Next Address Table descriptive of the flow chart of FIG. 6.

FIG. 6 is a flow chart similar to that set forth in FIG. 1 but requiring a different type of comparison in branch points <2> and <3>. A Next Address Table 12, shown in detail in FIG. 7 of the drawings, has a field-of-five with an S field for accommodation of the $\neq$, $>$, $<$, $\geq$, $\leq$, or $=$ comparisons. A concomitant modification of the logic circuitry in substitution for the Exclusive NOR gates of logic block 60 and insertion of a group of S field registers between multiplexer 16 and logic block 60 would also be required.

Accordingly, it is apparent in light of the foregoing teachings that the present invention provides an apparatus and a method for determination of the addresses of the next program instruction, and its ensuing branch point in a digital computer routine without the delay inherent in performance of any intervening branch condition. By varying such components as the arrangement of the fields of the memory unit devoted to storage of the information and data pertaining to the branch point conditions, the number and arrangement of field registers, and the logic circuitry of the logic block, embodiments of this invention may be used for determination of the next program and branch points for routines and processing programs requiring a variety of branch condition comparisons.

The foregoing embodiments are merely illustrative of the basic principles of the invention. Obviously, numerous modifications and variations of the present invention are possible in light of the above teachings. For example, although the block diagrams of FIGS. 3 and 5 show a R field in next address table 12, and a corresponding group of R field registers, since the branch conditions at any branch point are always mutually exclusive, by limiting the order of comparison of the instruction registers to a selected order, and reading those instruction registers directly, the necessity of using the R fields and the R field registers may be avoided with a concomitant simplification of circuitry. In addition, the number of field registers may be reduced to four in the remaining registers 30, 40, 70, 80 are loaded with the contents of the respective memory fields after each comparison. A block diagram showing the simplification in hardware thereby obtained is set forth in FIG. 8 of the drawings.

Although the foregoing embodiments were described as providing the next routine address to a commonly used routine such as a compiler, it should be apparent that the apparatus and method embodiments of the present invention may also be used, although not necessarily efficiently, to operate directly upon the branch conditions of a multitude of user language programs.

What is claimed as new and desired to be secured by a sealed Letters Patent of the United States is:

1. A method for determining the next program address of a routine controlling that portion of a digital computer dedicated to processing programs, the routine having a plurality of sets of addressed instructions, the last instruction in each set being separated from any other set by at least one branch point, each branch point having a plurality of lateral branch conditions followed by a default condition, each branch condition specifying the name of a selected one of the data registers and a literal value to be compared against the value of the specified one of the data registers, and followed affirmatively by one of the sets of instructions, and the computer having a plurality of named data registers for receiving the instructions of a program and a program counter for retaining the address of the current routine instruction, comprising the steps of:

identifying each of a plurality of multi-field table locations in an addressable table memory with a table address corresponding to a different one of said branch points, the number of fields represented by each table address to exceed by at least four a quantity equal to four times the number of branch conditions at the corresponding branch point;

storing at each table address in successive fields of four, for each of the branch conditions occurring at the branch point corresponding to each table address, in order of routine execution, data corresponding to each of the branch conditions, comprising:

the name of the one of said data registers specified by the respective one of said branch conditions;

the literal value specified by the respective one of said branch conditions;

the address of the one of said routine instructions following affirmatively the respective said branch condition; and, the address of the branch point first following the one of said routine instructions following affirmatively the respective one of said branch conditions;

storing at each table address in the field-of-four next succeeding those filled by the preceeding step with data for the corresponding branch point, comprising:

a default que word;

a logically blank word;

the address of the one of said routine instructions following the default condition of the corresponding branch point; and, the address of the branch point first following the one of said routine instructions following the default condition of the corresponding branch point;

initiating execution of a current set of said routine instructions;

loading a program into said data registers according to the order of said routine;

comparing at the table address corresponding to the branch point following the set of routine instructions for which execution has been last initiated, in each of successive fields-of-four, beginning with the first field-of-four and continuing until an affirmative comparison is made, the value of the data register having its name stored with the literal value;

comparing the value of the data register having its name stored with the literal value stored in each of successive fields-of-four at the table address corresponding to the branch point following the set of routine instructions for which execution has been last initiated, beginning with the first field of four and continuing until an affirmative comparison is made;

transferring to a plurality of memory means the addresses stored in the last of said fields-of-four in which said said step of comparing occurs;

continuing execution of said current set of routine instructions until the last instructions of said current set of said routine instuctions is completed;

loading into said program counter the one of said addresses stored in said plurality of memory means and corresponding to one of said instructions upon execution of said last instruction of said current set of routine instructions; and, initiating execution of the set of routine instructions beginning with that one of said instructions corresponded by the address currently in said program counter.

2. In a digital computer having an incremental program counter for implementing execution of a set of routine instructions upon reception of the address of the first of the set of routine instructions, and a plurality of instruction registers for transitory storage of logic values, a next address subprocessor for providing the address of the first routine instruction of a succeeding set of routine instructions to the program counter during execution of a routine common to a plurality of programs, the routine having a plurality of sets of routine instructions, each instruction having a distinct address, each set of said sets terminating at a branch point having a plurality of lateral branch conditions followed by a default condition, each condition potentially leading to a set of said sets, comprising:

table memory means having a plurality of addressable memory locations, each memory location arranged in sequentially repetitive groups of memory fields and corresponding to a different one of said branch points, each group within any of said groups sequentially dedicated to a different one of said conditions at the corresponding one of said branch points, for storage of information and values pertaining to said routine instructions;

a buffer for receiving the information and values from said table memory means;

an incrementable table register for initiating the transfer of the information and values stored at any one of said memory locations into said buffer upon reception of the address of that one of said memory locations;

a plurality of groups of field registers, each field register available for storing as logic values the contents of a different one of said memory fields at the memory address last received by said table register;

a first multiplexer for coupling said buffer individually to said field registers;

logic means coupled to said instruction registers for sequentially comparing logic values contained in said field registers in sequence against the logic values contained in said instruction registers and generating a signal indicative of which of said field registers contained affirmatively compared logic values;

a second multiplexer for transferring the logic values contained in a selected one of said groups of field registers to said program counter in response to reception of said signal, whereby said program counter is incremented to that value contained in the selected field register.

3. A next address subprocessor as set forth in claim 2, further comprising:

a third multiplexer for transferring the logic values contained in a chosen one of said groups of field registers to said incrementable table register in response to reception of said signal, whereby said table register is incremented to that value contained in the chosen field register.

4. A next address subprocessor as set forth in claim 3, further comprising:

said plurality of groups of field registers equaling in number the number of memory fields in that one of said addressable memory locations having the greatest number of memory fields.

5. A next address subprocessor as set forth in claim 3 further comprising:

each of said groups of memory fields containing an equal number of memory fields;

said plurality of groups of field registers equaling in number the number of memory fields in one of said groups of memory fields.

6. A next address subprocessor as set forth in claim 3, wherein:

each of said instruction registers has a different name;

any of said instruction registers is specified by each of said branch conditions;

any literal value is specified by each of said branch conditions;

for each group dedicated to a branch condition, said information and values comprise:

the name of the one of said instruction registers specified by the respective one of said branch conditions;

the literal value specified by the respective one of said branch conditions;

the address of the one of said routine instructions following affirmatively the respective said branch condition; and, the address of the branch point first following the one of said routine instructions following affirmatively the respective one of said branch conditions;

for each group dedicated to a default condition, said information and values comprise:

a default que word;

a logically blank word;

the address of the one of said routine instructions following the default condition of the corresponding branch point; and, the address of the branch point first following the one of said routine instructions following the default condition of the corresponding branch point.

7. A next address subprocessor as set forth in claim 6 wherein:

any relative equality symbol is specified by each of said branch conditions; and, for each group dedicated to a branch condition, said information and values further comprise the symbol specified by the respective said branch condition.

* * * * *